W. D. STOCKLY.
SELF LUBRICATING WHEELED VEHICLE.
APPLICATION FILED OCT. 20, 1913.
1,108,807.
Patented Aug. 25, 1914.
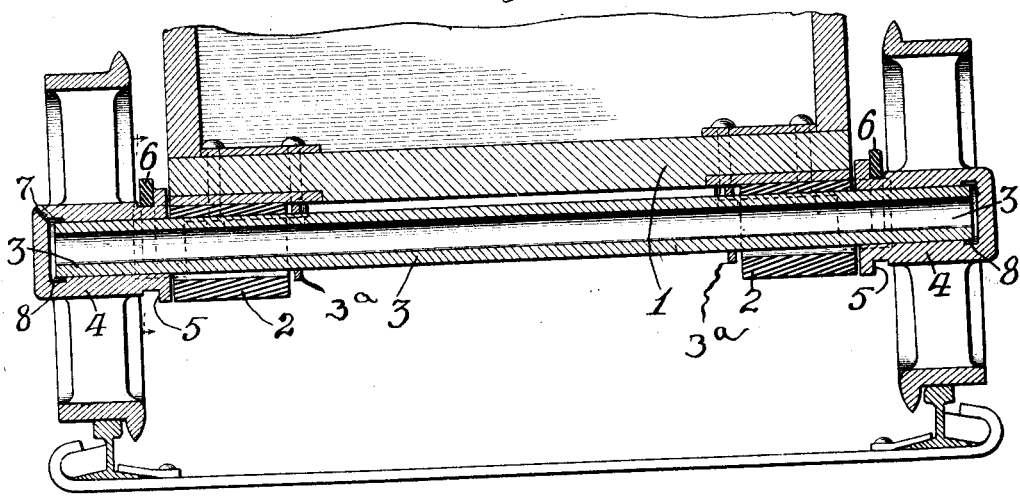
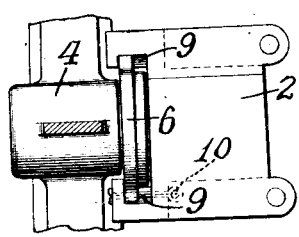
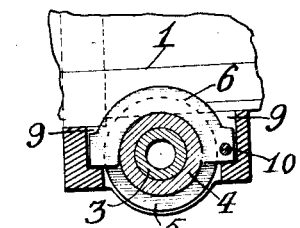
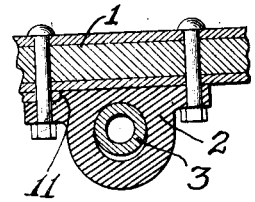
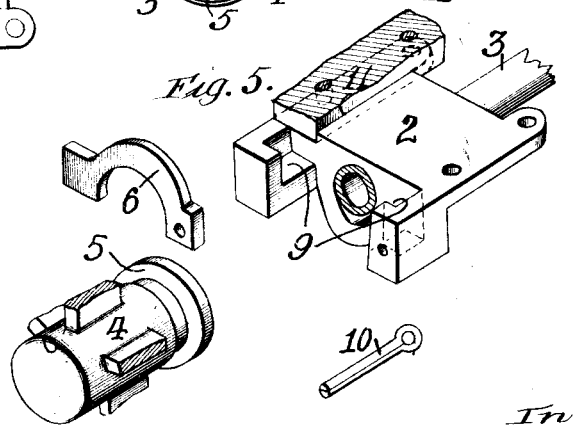
Witnesses:
Inventor:
Walter D. Stockly,
By Knight Bros
Attys.

UNITED STATES PATENT OFFICE.

WALTER D. STOCKLY, OF FAIRMONT, WEST VIRGINIA, ASSIGNOR TO MINING APPLIANCES COMPANY, A CORPORATION OF WEST VIRGINIA.

SELF-LUBRICATING WHEELED VEHICLE.

1,108,807. Specification of Letters Patent. Patented Aug. 25, 1914.

Application filed October 20, 1913. Serial No. 796,255.

*To all whom it may concern:*

Be it known that I, WALTER D. STOCKLY, a citizen of the United States, residing at Fairmont, in the county of Marion and State of West Virginia, have invented certain new and useful Improvements in Self-Lubricating Wheeled Vehicles, of which the following is a specification.

This invention relates to wheeled vehicles and particularly to that class in which are used floating tubular axles which serve as a reservoir for lubricant.

The invention has for its objects to provide a construction of this general character, in which each wheel will be secured in its relation to the vehicle, independently of the other wheel and of the axle; and in which parts fixed upon the vehicle body will abut directly against the inner ends of the wheel hubs in transmitting thrust to the wheel flanges, and in which the body will have some transverse play between the abutting ends of the wheel hubs, though serving to positively gage the distance between the wheels within necessary limits; and in which the axle will be free within limits to move lengthwise relatively to the wheels and to the body, but will be in abutment with the body at each end of its said relative movement and will be encountered by the body before the body abuts against the wheel hub, in order that the side thrust of the body will develop a positive pumping action of the axle in the wheel to force the lubricant contained within the axle out into the bearing between the axle and the wheel.

The invention will be fully understood upon reference to the accompanying drawing, which represents the invention embodied in a known type of mine car, and in which—

Figure 1 is a vertical section through a portion of the body, the axle, the wheels and the track; Fig. 2 is a top plan view of the attaching box and wheel hub; Fig. 3 is a section on the line 3—3, Fig. 2; Fig. 4 is a section on the line 4—4, Fig. 2; and Fig. 5 is a perspective view of parts of the attaching box, hub and coupling, segregated.

1 represents the car body, 2 the attaching boxes, 3 the tubular axle, and 4 the wheels. The wheels are constructed with flanges 5 on the inner ends of their hubs to receive a coupling yoke 6 to secure them to the boxes 2. One or both of the wheels may be further provided with a filling port 7, through which to introduce lubricant. The outer ends of the wheel hubs are closed, but are preferably formed with an enlargement 8 in the bore of the wheel to permit lubricant to accumulate at the end of the axle, so that it will be displaced inward between the wheel and the axle as the result of the pumping action of the axle incident to the travel of the vehicle.

9 represents pockets formed in the attaching box 2 to receive the coupling yokes 6; said pockets being enlarged in the direction of end thrust upon the axle, to admit of sufficient lost motion between the wheel and the box to accomplish the pumping action hereinafter described. The thrust is transmitted directly from the car to the wheel through the medium of the boxes 2, which bear against the inner ends of the hub. The coupling yokes 6 transmit no thrust to the wheels, but merely restrain the wheels from separation from the car. The coupling yokes 6 are of such form that they drop freely into position in front of the flanges 5 and into the pockets 9 where they may be removably secured by means of cotter pins 10. The distance between the abutting faces of the attaching boxes 2 is such as to permit some lateral movement between the body and the wheels, so that in abutting against first one wheel and then the other, some motion will be developed in the body. The axle 3 is restrained by the boxes 2 only in transverse directions; the bores through the boxes being preferably enlarged, as shown in Fig. 4, in order to avoid binding the axles therein against either rotary or endwise movement. The axles are free to move endwise in the bearing boxes 2 within limits determined by the collars 3ª, which provide abutments for the inner ends of the bearing boxes and cause an endwise pumping stroke to be developed in the axle by the lateral motion of the car body without destroying the inherent character of the axle as a floating axle. That is to say, when the car body moves sidewise relatively to the track, before it is arrested by the rail acting through the wheel flange and the wheel hub against the block 2, on the side toward which the body is moving, the block 2 on the opposite side will have impinged against the collar 3ª and imparted an endwise thrust to the axle.

Either wheel may be removed with ease by simply raising the coupling yoke 6 from position, while the car is jacked up, and when so removed will leave the other wheel completely attached and unimpaired in its connection with the vehicle. Moreover, the particular method of attaching the wheels directly to the boxes avoids any opening in the outer ends of the wheels and thus prevents waste which would otherwise occur. The attaching boxes 2 are further provided with shoulders 11 in their upper faces for abutment against the transverse members in the car body frame to relieve the attaching bolts from strain.

In use, the shifting of the body from side to side by its own inertia in rounding curves imparts thrust directly to the wheel on the outer rail of the curve and at the same time develops relative movement which is sufficient to transmit end thrust to the axle 3, and when a curve is encountered in the other direction, the parts shift in the opposite direction. This driving of the axle forces lubricant in between the wheels and the axle and keeps the parts thoroughly lubricated.

The axle being a straight tubular member without bearing, shouldering or other special formation, is very cheap to be produced and durable in use.

I claim:—

1. In a wheeled vehicle, the combination of wheels having hubs formed with axle bearings and with closed outer ends, a floating axle entering the hubs of said wheels and unrestricted thereby except by abutment against their closed outer ends, a car body, attaching boxes on the car body in which the axle has bearings, but is free to rotate and shift longitudinally and which attaching boxes have direct abutment against the wheel hubs, and couplings carried solely by the attaching boxes and engaging directly with the wheels in the direction to restrain outward movement of the wheels relatively to the car body but with a freedom permitting relative axial movement between the wheels and body.

2. In a wheeled vehicle, the combination of a body, attaching boxes carried by said body, an axle mounted in said boxes with freedom of rotation and axial movement, wheels fitted upon the ends of said axle but having freedom of axial movement relatively thereto, said wheels being in direct abutment with the attaching boxes, and means fixing the wheels against outward displacement relatively to the attaching boxes consisting of flanges on the inner ends of the wheel hubs, pockets formed in the attaching boxes and overlapping said wheel hub flanges, and yokes inserted in front of the wheel hub flanges and into said pockets, but permitting limited relative movement between the body and wheels in the direction of the axis of the wheels.

3. In a wheeled vehicle, the combination of wheels having hubs formed with axle bearings and with closed outer ends, a floating axle entering the hubs of said wheels and unrestricted thereby except by abutment against their closed outer ends, a car body, attaching boxes on the car body in which the axle has bearings, but is free to rotate and shift longitudinally and which attaching boxes have direct abutment against the wheel hubs, and couplings carried solely by the attaching boxes and engaging directly with the wheels in the direction to restrain outward movement of the wheels relatively to the car body but with a freedom permitting relative axial movement between the wheels and body; said axles having abutments in position to be abutted by the inner end of an attaching box on one side, before the wheel hub is abutted by the outer end of the attaching box on the other side.

4. In a wheeled vehicle, the combination of a body, attaching boxes carried by said body, an axle, mounted in said boxes with freedom of rotation and axial movement, wheels fitted upon the ends of said axle but having freedom of axial movement relatively thereto, said wheels being in direct abutment with the attaching boxes, and means fixing the wheels against outward displacement relatively to the attaching boxes consisting of flanges on the inner ends of the wheel hubs, pockets formed in the attaching boxes and overlapping said wheel hub flanges, and enlarged in the direction of end thrust upon the axle to permit of lost motion between the wheel and the box, and yokes inserted in and carried by said boxes in front of the wheel hub flanges, but permitting limited relative motion between the body and the wheels in the direction of the axis of the wheels.

The foregoing specification signed at Fairmont, West Virginia, this 6th day of October, 1913.

WALTER D. STOCKLY.

In presence of two witnesses:
J. C. EVANS,
H. GRAU.